May 26, 1970  R. G. PORTIS  3,513,702
GAGING APPARATUS FOR A TANK
Filed April 18, 1968  2 Sheets-Sheet 1
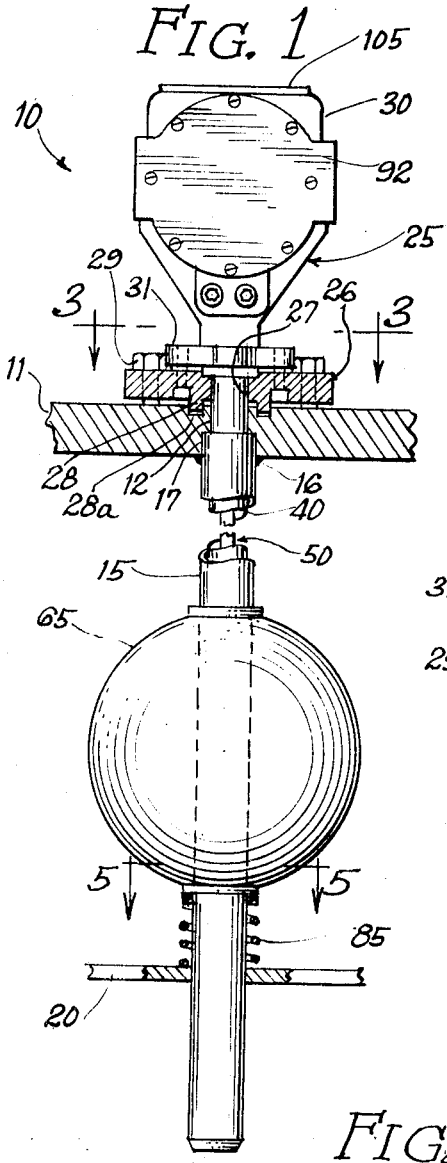
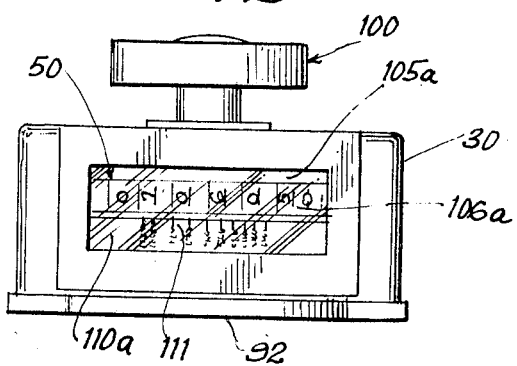
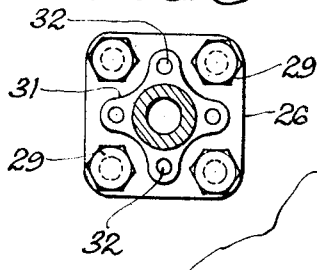
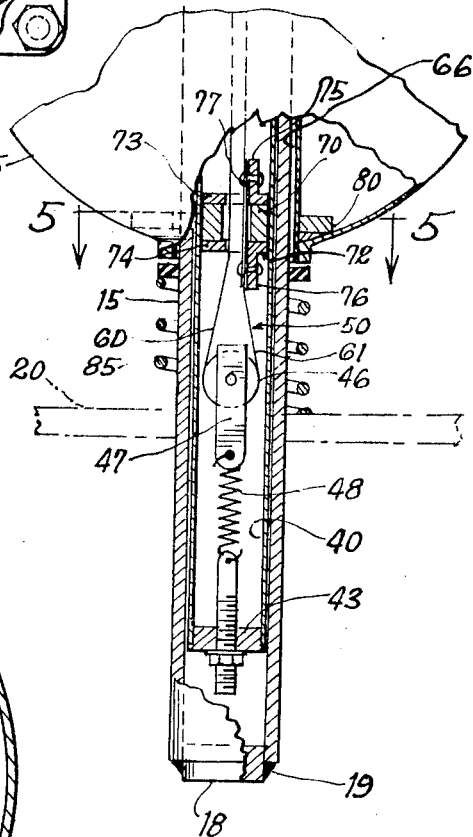
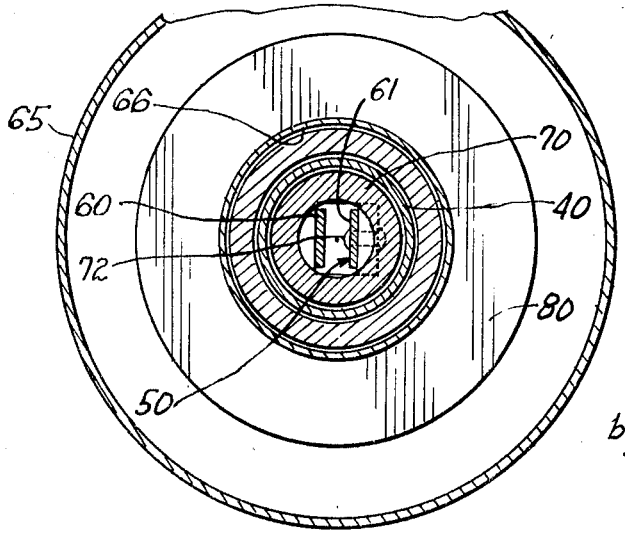
INVENTOR
Ralph G. Portis
by Zabel, Baker, York, Jones
and Dithmar
Att'ys

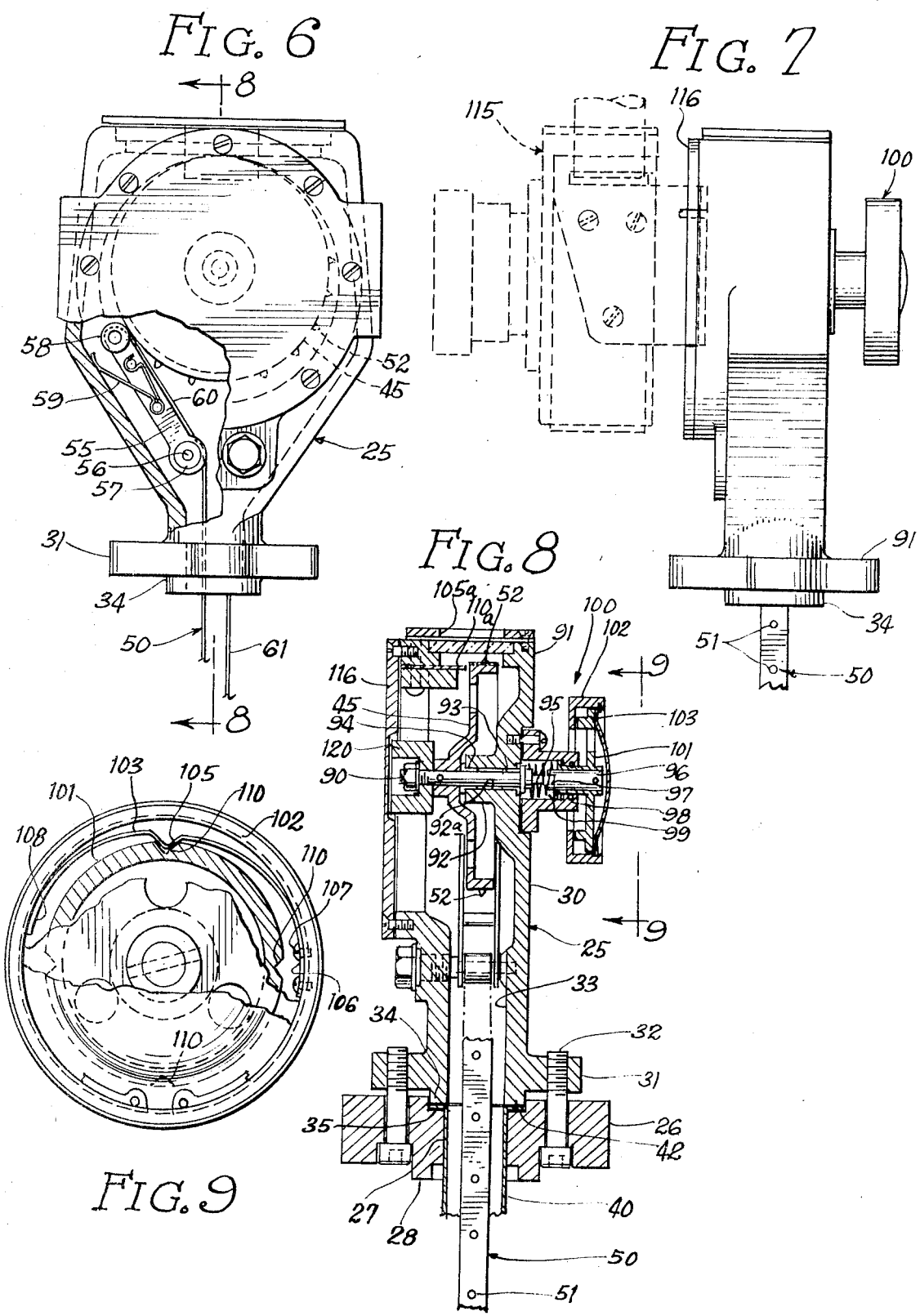

3,513,702
GAGING APPARATUS FOR A TANK
Ralph G. Portis, Highland Park, Ill., assignor to Midland Manufacturing Corporation, Skokie, Ill., a corporation of Illinois
Filed Apr. 18, 1968, Ser. No. 722,314
Int. Cl. G01f 23/08
U.S. Cl. 73—321
4 Claims

ABSTRACT OF THE DISCLOSURE

Gaging apparatus for indicating in a continuous manner the level of liquid in a tank includes a well member sealed against the entry of liquid or vapor from the tank. A pulley-mounted endless tape is mounted within an inner housing in the sealed well member and magnetically coupled to a float member which is movably guided by the well member in response to varying liquid level. Manual means to permit jiggling is provided to determine the status of the magnetic coupling between float member and tape. Further, subsidiary means is provided to prevent damage to the apparatus when the manual means is actuated.

BACKGROUND OF THE INVENTION

This invention relates to gaging apparatus for indicating in continuous manner the level of liquid in a tank, and more particularly to gaging apparatus employing a buoyant member adapted to float on the surface of the liquid to be gaged.

The gaging apparatus of the invention has been designed particularly for railway tank cars and large stationary tanks, but in general the apparatus is usable to advantage with tanks of any type which contain liquid requiring periodic knowledge of the level or quantity of the liquid therein, or the amount withdrawn at a discharge station.

The closest approach in the prior art to the present invention is thought to be the disclosure of U.S. Pat. No. 2,752,784. The apparatus of this patent uses an endless tape, as does the present invention, but the tape is used in a different manner for a different purpose, and in other respects the prior apparatus is distinctly different.

SUMMARY OF THE INVENTION

The gaging apparatus of the invention is completely sealed with respect to the liquid and vapor within the tank, i.e., the liquid or vapor does not enter any part of the apparatus. A sealed relationship of the apparatus with the tank precludes the possibility of contamination of the liquid in the tank from the outside. The level or quantity of liquid in the tank easily is read directly and continuously at an exposed portion of the gaging apparatus, or, alternatively, the apparatus is adapted to be coupled with a system providing continuous read out at a remote location.

The apparatus of the invention includes an elongated imperforate well member of non-magnetic material extending vertically within the tank through the range of liquid level variation to be gaged. The well member preferably has one end sealed to the tank at an access opening, and the other end closed. Thus, liquid and vapors in the tank at all times are excluded from the interior of the well member, and prevented from escaping to atmosphere. In preferred form, the well member includes an outer member, and an inner member generally coextensive and coaxial therewith. The outer member usually is sealed with respect to the tank itself, and the inner member is secured to that portion of the gaging apparatus which is subject to occasional removal from the tank.

The removable portion of the gaging apparatus includes a support means mounted on the exterior of the tank adjacent the access opening. A pulley is mounted on the support means in general alignment with the access opening, and another pulley is mounted in the well member adjacent the other end thereof. The support means preferably includes a sealed housing.

An endless tape mounted on the two pulleys extends between them in the well member, or in the inner member of the well member. As one end of the well member is sealed at the access opening of the tank, and the other end is closed, it will be seen that liquid and vapors from the tank interior are excluded from the aforesaid endless tape, as well as from the pulleys and other components of the apparatus associated with the support means.

The apparatus also includes a float member which moves up and down with the level of the fluid in the tank. The float member is guided by the well member for vertical movement. In preferred form, the float member has a central opening, the well member passing loosely through this opening and serving as a float member guide.

First and second magnetic members, at least one of which is magnetized, are associated, respectively, with one length of the endless tape and the float member. These members magnetically couple the float member to the one length of endless tape. Thus, vertical movement of the float member produces corresponding movement of the endless tape.

The level or quantity of liquid is indicated either by calibrations on the tape and an index mark, or by a remote read out system activated by the tape movement and position. The read out portion of the apparatus is mountable at the top, bottom, or side of the tank, as will be seen.

The gaging apparatus of the invention includes additional structural and functional features which will be set forth in connection with the description of the preferred, illustrated embodiment.

BRIEF DESCRIPTION OF THE DRAWINGS

In the drawings:

FIG. 1 is an elevational view, partly in section, of gaging apparatus embodying the invention, the apparatus shown mounted on associated parts of a tank or other receptacle for liquid.

FIG. 2 is an enlarged top view of the apparatus showing a read out window wherein the level or quantity of liquid in the tank may be read directly from the apparatus.

FIG. 3 is a sectional view on line 3—3 of FIG. 1.

FIG. 4 is an enlarged elevational view, partly in section and partly broken away, of a fragmentary portion of the gaging apparatus.

FIG. 5 is a sectional view on line 5—5 of FIG. 4.

FIG. 6 is an enlarged elevational view, partly in section and partly broken away, of a fragmentary portion of the apparatus.

FIG. 7 is a side elevational view of the apparatus portion shown in FIG. 6, the local part of a remote read out system being mounted thereon and shown in broken line.

FIG. 8 is a sectional view on line 8—8 of FIG. 6.

FIG. 9 is a fragmentary elevational view, partly broken away, on line 9—9 of FIG. 8.

DESCRIPTION OF THE PREFERRED EMBODIMENT

Referring to the drawings, and particularly to FIG. 1, gaging apparatus embodying the invention is generally designated 10. The numeral 11 designates a fragmentary portion of a tank on which gaging apparatus 10 is mounted. Tank portion 11 may be part of a manway cover plate, i.e. the plate which seals an opening or manway in the tank sufficiently large for a man to enter. In such case, the cover plate is adapted to be sealed around the edges of the manway.

An opening 12 is provided in tank portion 11. A part of gaging apparatus 10 extends through opening 12, as will be seen.

An elongated imperforate well member 15 of non-magnetic material extends vertically in the tank generally from top to bottom, or at least through the range of liquid level variation to be gaged.

As illustrated, gaging apparatus 10 is mounted on the tank top, but, as previously mentioned, the apparatus may be mounted on the tank bottom or a side if desired.

When gaging apparatus 10 is mounted on the tank top, as shown in FIG. 1, the upper end of well member 15 is secured to tank portion 11 in alignment with opening 12 as by welds 16. Thus, well member 15 will have a sealed mounting with respect to tank portion 11. For additional strength, the upper end of well member 15 desirably is received within a counterbore 17 in tank portion 11, the counterbore being aligned with opening 12.

The other or lower end of well member 15 is closed in sealing manner as best shown in FIG. 4 wherein a plug 18 is suitably secured in place as by welds 19.

A horizontal member 20 (FIGS. 1 and 4) mounted in the lower portion of the tank desirably is provided to position and laterally support the lower end of well member 15.

Still referring to FIG. 1, the portion of gaging apparatus 10 located exteriorly of the tank is described generally as support means 25 which, as shown, has a number of components mounted thereon or forming a part thereof. Support means 25 includes a mounting plate 26 having a central opening 27, best shown in FIG. 8, and an annular flange 28 on the lower face, the flange concentric with opening 27 and of greater diameter. Flange 28 is adapted to enter an annular recess 28a (FIG. 1) in the upper surface of tank portion 11, and establish a sealed relationship between mounting plate 26 and tank portion 11. Mounting plate 26 is detachably secured to tank portion 11 in any suitable manner as by bolts 29, best shown in FIG. 3.

Referring again to FIG. 8, support means 25 preferably includes a sealed housing 30 having a base 31 detachably secured to mounting plate 26 in suitable manner as by inverted bolts 32. Housing 30 and base 31 have an opening 33 in alignment with opening 27 in mounting plate 26. An annular boss 34 on the lower surface of base 31 surrounds the entrance of opening 33 and is received within a counterbore 35 in mounting plate 26.

Before further describing support means 25 and the component parts thereof and thereon, reference is made to an elongated inner member 40 (FIGS. 1, 4, 5 and 8) of non-magnetic material which is carried by support means 25, particularly plate 26, and extends within well member 15 substantially the length thereof.

Referring to FIG. 8, elongated inner member 40, as shown, extends into opening 27 in mounting plate 26. The upper end of inner member 40 has a radial flange 42 which is seated in the bottom of counterbore 35, and clamped in position in sealed manner by boss 34 of base 31.

As shown in FIG. 4, a plug 43 or the like is mounted in the lower end of inner member 40.

Still referring to FIG. 8, a first pulley 45 is rotatably mounted on support means 25 within housing 30 in general alignment with openings 33, 27 and 12, these openings in turn being aligned with well member 15. A second pulley 46 (FIG. 4) is mounted in inner member 40 adjacent the lower end thereof. Pulley 46 is mounted for rotation on a bracket 47, a spring 48 being connected between the bracket and plug 43 at the lower end of inner member 40. The function of spring 48 will be mentioned presently.

An endless tape generally designated 50 (FIGS. 1, 4, 5, 6, 7 and 8) is mounted on first and second pulleys 45 and 46. The aforesaid spring 48, of course, applies tension to endless tape 50.

As shown, first pulley 45 is of the sprocket type, and tape 50 has perforations 51 (FIGS. 7 and 8) for positive drive connection with sprocket teeth 52 (FIG. 8) on sprocket pulley 45.

Referring to FIG. 6, the illustrated preferred embodiment includes a pair of symmetrical arms 55, only one of which is shown, mounted on support means 25. Each arm 55 is pivoted on a pin 56. Idler rollers 57 and 58 are rotatably mounted at opposite ends of each arm 55, the former aligned with openings 33, 27 and 12 and serving to direct a length of endless tape 50 through the openings toward the periphery of pulley 45, and the latter to bear against the tape length on the pulley. A leaf spring 59 of irregular shape urges arm 55 in clockwise direction, and a similar spring (not shown) urges the other arm in counterclockwise direction, insuring that upper idler rollers 58 are effective to retain tape 50 in place on pulley 45.

As shown in FIG. 6, the left hand length 60 of endless tape 50 passes over lower idler roller 57 of left arm 55 and between upper idler roller 58 and pulley 45. The right hand length 61 of tape 50 has corresponding relation with the idler rollers on the other pivoted arm 55.

Referring to FIGS. 1, 4 and 5, a float member 65 adapted to move vertically with variation in liquid level is guided by well member 15. As illustrated, float member 65 is a hollow ball of suitable material such as plastic or non-magnetic metal having a central opening 66 of sufficiently large diameter to permit well member 15 to pass loosely therethrough. Thus, float member 65 rises and falls with liquid level variation in guided relation with well member 15.

As best shown in FIG. 4, a first magnetic member 70 of circular shape with a central opening is mounted on a holding means 72, the latter being secured to length 61 of tape 50. As illustrated, holding means 72 comprises upper and lower plates 73 and 74, each having a central opening aligned with the central opening of first magnetic member 70, the plates respectively having flanges 75 and 76 secured to tape length 61 as by rivets 77 (FIG. 5).

Still referring to FIG. 4, and to FIG. 5 float member 65 has an annular magnetic member 80, hereinafter sometimes called the second magnetic member, located adjacent the lower end of central opening 66. One or both of first and second magnetic members 70 and 80 is magnetized in order to provide a magnetic couple between them. Thus, as float member 65 moves up and down with variation in the level of the liquid in the tank, endless tape 50 travels on first and second pulleys 45 and 46, the tape position having a functional relationship with the vertical position of float member 65.

As shown in FIGS. 1 and 4, a spring 85 may surround well member 15 between float member 65 and horizontal member 20 in the lower portion of the tank, spring 85 serving to cushion the float member at its lower limit of travel.

The magnetic couple between float member 65 and endless tape 50 is subject to accidental separation, particularly in the case of mobile tanks such as those carried by railroad car or motor vehicle where the liquid is subject to agitation and change in instantaneous level independently of static level. It, therefore, is desirable to provide a means for ascertaining the condition of the magnetic couple from time to time.

Referring again to FIG. 8, pulley 45 is keyed to a rotatable shaft 90 mounted in housing 30 of support means 25. Thus, as shown, wall 91 of housing 30 has an inwardly extending boss 92, bearings 93 and 94 being positioned at opposite ends of an opening 92a in the boss. Shaft 90 is journalled in bearings 93 and 94. The right end of shaft 90 terminates in a reduced portion 95 of non-circular cross section, this portion comprising one part of a positive clutch mechanism.

The other part of the positive clutch mechanism is aligned shaft 96 having a jaw 97 adapted to receive non-circular end 95 of rotatable shaft 90. Shaft 96 is axially movable in bearing 98, and a compression spring 99 urges shaft 96 outwardly so that jaw 97 thereof normally is out of engagement with non-circular part 95 of shaft 90. A manual knob assembly, generally designated 100, is mounted on shaft 96, as will be seen, so that the latter may be moved inwardly to engage the clutch mechanism, and rotated to rotate shaft 90 and first pulley 45 keyed thereto.

As shown in FIGS. 8 and 9, manual knob assembly 100 comprises an inner portion 101 which is secured to shaft 96 and an outer portion 102 which has a drive relationship with inner portion 101, the drive relationship being disengageable, as will be seen. In the form of the invention shown, a circumferentially extending leaf spring 103 or the like is disposed between inner and outer portions 101 and 102 of manual knob assembly 100, the spring having a V-shaped bend 105 (FIG. 9) intermediate its ends. End 106 of spring 103 is anchored to outer portion 102 by suitable means 107, and the other end 108 freely bears against outer portion 102. A plurality of V-shaped seats 110 are provided in the periphery of inner portion 101, and outer portion 102 may be rotated relative to inner portion 101 so that V-shaped bend 105 in spring 103 will seat in one of the recesses and establish a drive connection between outer portion 102 and inner portion 101.

When a question exists as to whether or not a magnetic couple between the first and second magnetic members 70 and 80 exists, an operator merely pushes in on knob assembly 100 to establish a connection through the previously described positive jaw clutch, and rotates the knob assembly through a small angle, causing the float to move either up or down. Thereafter, knob assembly 100 is released, and if there is an immediate return to original position, it can be concluded that the magnetic couple is connected. If there is no return, the couple has become disconnected, and it is in order to rotate knob assembly 100 until coupling is established, and checked as mentioned above by further slight rotation of the knob assembly.

The disengageable drive relation between inner and outer portions 101 and 102 of knob assembly 100 is provided to avoid possible damage from jamming when first magnetic member 70, or holders 75 and 76 therefor, encounter a stop or obstruction at the upper or lower end of well member 15. Such obstruction would be a roller 57 at the upper end, or second pulley 46 near the lower end. When obstruction is encountered, the drive connection through spring 103 is broken and outer portion 102 rotates independently of inner portion 101. Thus, it is not possible for careless manipulation of knob assembly 100 to result in damage or jamming when first magnetic member 70 engages a stop.

Referring to FIG. 2, a window 105a is provided in housing 30 in general alignment with endless tape 50 on first pulley 45. As seen, tape 50 contains suitable calibrations 106a which may be in inches of liquid depth, gallons of liquid, or other appropriate measure.

A stationary plate 110a in housing 30 adjacent tape 50 behind window 105 contains at least one index mark 111 opposite which a reading from tape 50 is taken. Inasmuch as different liquids have different specific gravities, and accordingly will position float member 65 at different levels of elevation when the liquid levels are the same, plate 110a preferably is provided with a plurality of index marks 111, as shown, the location of each mark being a function of a value of specific gravity. Thus, with specific gravity of the liquid in the tank known, the reading may be made directly by using the index mark for that value of specific gravity.

FIG. 7 shows in broken line the local portion 115 of a remote read-out device. When such a device is used, it is mounted on non-magnetic closure plate 116 (FIGS. 7 and 8) of housing 30 and coupled to shaft 90 by means of a magnet 120 on the left end of the shaft. A Selsyn mechanism (not shown) or the like in portion 115 is driven by shaft 90 which in turn responds to first pulley 45, tape 50, and the level of float 65.

When gaging apparatus 10 is mounted on a detachable portion 11 of a tank, such as a manway cover, the gaging apparatus is mountable without requiring welding to the tank proper, a highly desirable feature. Further, with the arrangement shown, support means 26, the parts carried thereby and inner member 40 readily may be removed from the tank, inspected and replaced as a unit.

It has been mentioned that the local read-out portion of the gaging apparatus may be mounted at the top, bottom, or side of a tank. The illustrated embodiment shows apparatus mounted on the top of the tank. A mounting of the read-out portion at the bottom of the tank involves generally a structural reversal, the well 15 still being vertical. When the local read-out portion is to be mounted on the side of a tank, well member 15 is positioned to extend at an angle within the tank through the range of liquid level variations to be gaged. Such inclination of well 15 requires a change in the tape calibrations either physically or by a multiplier to compensate for the increased linear travel of the tape for each vertical unit traversed by the float.

Alternatively, the local read-out portion may be mounted on the tank side and well 15 may be vertical, as for top or bottom mounting. In this case, suitable piping extends from the exposed end of the well member to the read-out portion. Additional pairs of idler rollers are used at bends in this piping to guide the lengths of tape 50 properly between the end of well member 15 and first pulley 45.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letter Patent is:

1. Gaging apparatus for indicating the level of liquid in a tank, comprising:
- an elongated imperforate well member of non-magnetic material secured to the tank at an opening therein and extending in the tank through the range of liquid level variation to be gaged, said well member sealed against the entry of liquid;
- support means including a sealed housing on the exterior of the tank detachably secured in sealed manner to the tank in effective relation with the tank opening;
- an elongated inner member of non-magnetic material carried by said support means and extending within said well member substantially the length thereof;
- a first pulley carried by said support means, said first pulley having sprocket teeth;
- a second pulley carried by said inner member at the end thereof remote from said support means;
- a spring means disposed between said second pulley and said inner member;
- an endless tape mounted on said first and second pulleys, said tape having perforations receiving said sprocket teeth and said spring means insuring that said tape is maintained under tension;
- a first magnetic member secured to one length of said tape between said pulleys, said first magnetic member of circular shape with a central opening, both lengths of said endless tape extending through said central opening;

a float member having a central opening, said well member extending loosely through said central opening and serving as a float member guide;

an annular second magnetic member on said float member adapted to be coupled magnetically to said first magnetic member, at least one of said magnetic members magnetized;

means responsive to tape travel on said pulleys for indicating in continuous manner the level of said float and thus the quantity of liquid in the tank;

a manual member mounted for rotation and axial movement on said support means; and compression spring and positive clutch means between said manual member and said first pulley permitting said manual member to engage and rotate said first pulley to ascertain and establish coupled relationship between said first and second magnetic members.

2. The combination of claim 1 wherein said manual member includes a shaft portion associated with said positive clutch means, a radially outer actuating portion carried by and relatively rotatable with respect to said shaft portion, and releasable means disengaging the driving connection between said portions when said first magnetic member engages a stop.

3. The combination of claim 1 with the addition of a rotatable shaft keyed to said first pulley, one end of said shaft having a coupling means adapted to couple with the local portion of a remote read out device.

4. The combination of claim 1 with the addition of a detachable cover plate closing the opening in the tank in sealed manner, said tubular well member secured in sealed manner to said cover plate around an opening therein, said support means secured to said cover plate in sealed manner, whereby installation of the gaging apparatus is free of welding on the tank, and said support means, said inner member and the parts carried thereby may be removed and replaced as a unit.

References Cited

UNITED STATES PATENTS

| | | | |
|---|---|---|---|
| 1,375,132 | 4/1921 | Cox | 73—321 |
| 2,139,810 | 12/1938 | Duncan. | |
| 2,531,774 | 11/1950 | Guthmann | 73—321 |
| 2,555,593 | 6/1951 | Lee | 73—321 |
| 2,592,929 | 4/1952 | Matchett. | |
| 2,771,774 | 11/1956 | Fornasieri | 73—313 |
| 2,995,824 | 8/1961 | Wells | 73—321 X |
| 3,283,578 | 11/1966 | Moore. | |

S. CLEMENT SWISHER, Primary Examiner

D. M. YASICH, Assistant Examiner

U.S. Cl. X.R.

73—290